Patented Sept. 21, 1954

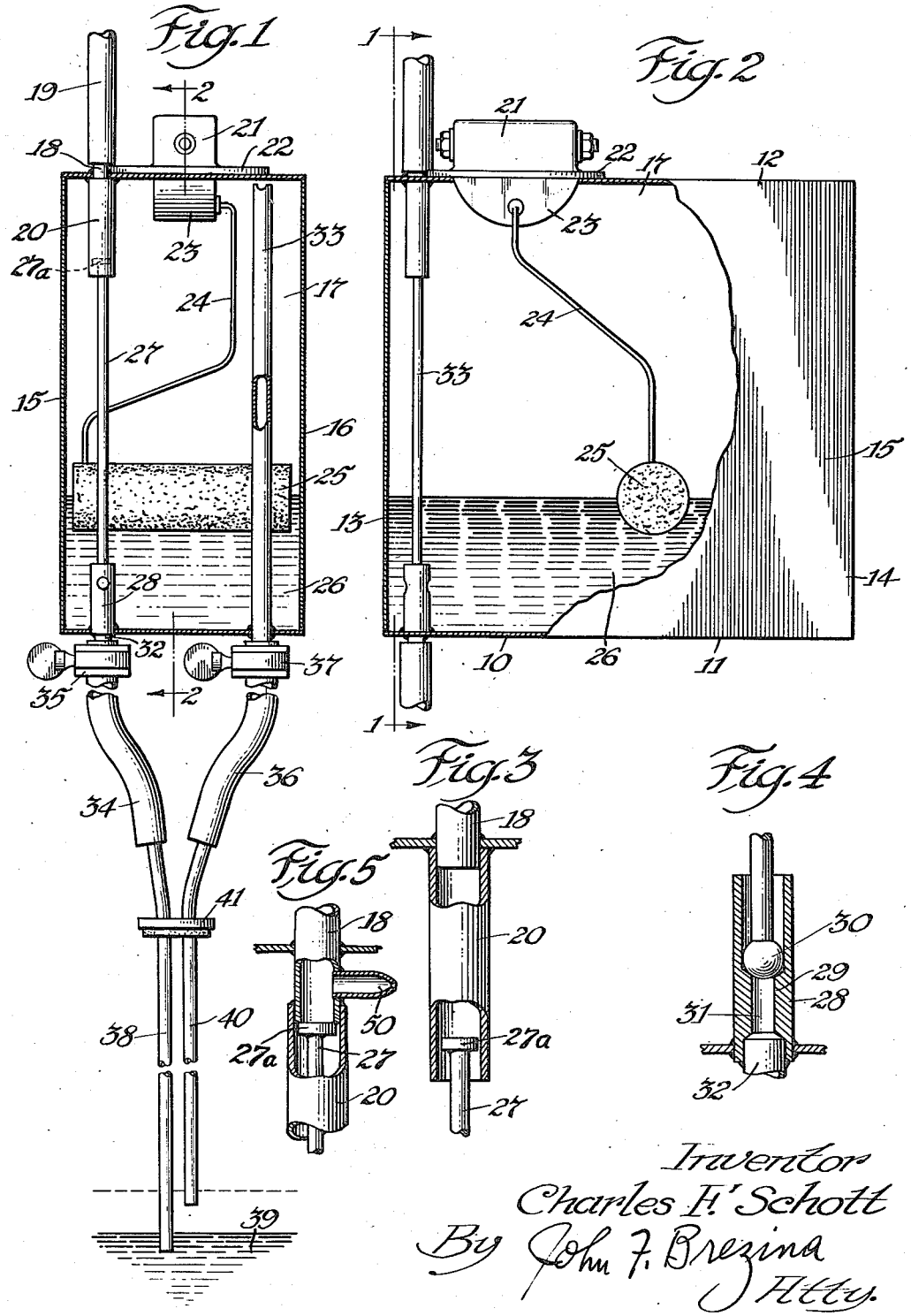

2,689,628

UNITED STATES PATENT OFFICE 2,689,628

AUTOMATIC OIL LEVEL CONTROL DEVICE

Charles F. Schott, Chicago, Ill.

Application July 26, 1950, Serial No. 175,991

8 Claims. (Cl. 184—103)

My invention relates to a new and novel device which is adapted to store oil used for lubricating engines and which is adapted to circulate the oil in the reservoir provided and more particularly my invention relates to a device for controlling the flow of oil from a reservoir into an engine or the like so that the engine is at all times supplied with adequate oil and yet will not become over-supplied by the oil from the reservoir which is circulated through the engine.

To my knowledge only one or two attempts have been made to provide an oil reservoir which was to be periodically filled as required in order to provide an adequate supply to an engine at all times. These prior devices have been unsuccessful because they have had no means for controlling at all times the amount of oil which was in the engine and as a result, excessive oil would be introduced into the crank case with resulting undesirable burning of oil.

It is therefore an object of my invention to provide a reservoir for the storage of oil and which is connected to a visual gauge for informing of the amount of oil remaining in the reservoir and in such device to provide means for causing circulation of the oil in the reservoir through the crank case.

It is additionally an object of my invention to provide a mechanical means and novel combination of elements for insuring that only as much oil as is necessary will be in the crank case at any one time. Additionally, it is an object of my invention to provide a means for precluding the flow of oil from the reservoir to the crank case during periods of inactivity of the engine so that excessive amounts of oil are never present in the crank case.

Additionally, it is an object of my invention to provide a reservoir having a plurality of conduits communicatively connected with the crank case and in which the regulation of the amount of oil in the crank case is controlled by the vacuum generated in the engine.

Other and further objects of my invention will become apparent from the following description and appended claims, reference being had to the accompanying drawings and numerals of reference thereon.

On the drawings:

Fig. 1 is a vertical sectional view of my device and illustrating the operative principles thereof and taken substantially on the line 1—1 of Fig. 2.

Fig. 2 is a vertical sectional view of my device taken substantially on the line 2—2 and looking in the direction of the arrows Fig. 3 is an enlarged detailed view showing the relationship of the upper end of the valve stem to the vacuum conduit or tube, parts being broken away for illustration.

Fig. 4 is an enlarged sectional view of the valve seat showing the relation thereof to the valve closing element.

Fig. 5 is a view substantially similar to Fig. 3 and illustrating a modified form of my invention.

Referring to the drawings, numeral 10 designates a housing shell or casing which comprises a lower wall 11, upper wall 12 and a pair of side walls 13, 14, 15 and 16. The walls 13 and 14 are illustrated in Fig. 2 and the walls 15 and 16 are illustrated in Fig. 1.

The walls are connected together in any suitable manner which may be by welding or the like to provide a substantially pressure tight enlarged chamber 17 within the housing 10. The upper wall 12 is apertured and a short tube section 18 is secured in a pressure tight seal, preferably intermediate its ends in said upper wall aperture. The tube section 18 may terminate a short distance below the upper wall 12.

A flexible tube, conduit or hose 19 is removably and adjustably mounted on one end of the tube section 18, preferably in a pressure tight seal, said tube 19 being communicatively connected to a vacuum developing source such as the intake manifold of an engine (not shown). A preferably short metallic cylinder or sleeve 20 is secured on the opposite ends of the tube section 18 by means of welding or the like preferably in a pressure tight seal and so that vacuum developed by the vacuum developing source is transmitted through a continuous conduit comprising the flexible hose 19, the tube section 18 and the sleeve 20. It will be seen that the lower end of sleeve 20 terminates at a point preferably substantially above the mid line of the reservoir 17.

As illustrated in Fig. 2, wall 12 has an enlarged aperture above which a housing 21 containing a gauge actuating mechanism, is secured. Said housing preferably has an enlarged annular flange 22 which is secured to the upper wall 12 by means of bolts or the like in a pressure tight mounting and said flange extends beyond the limits of said last mentioned aperture so that any vacuum developed within the reservoir 17 will not be dissipated. As illustrated in Figs. 1 and 2, a lower portion 23 of housing 21 extends through said last mentioned aperture and down into the reservoir 17 and a preferably angular bent arm 24 at an upper end is suitably pivoted and rotatably mounted in the lower end 23 of housing 21 to thereby actuate the mechanism within the housing 21. At its lower end the arm 24 is rigidly secured into a bob, buoyant cylinder or float 25 which is adapted to float on the top of the oil mass 26 in the reservoir 17 so that as the level of the oil within the reservoir changes the position of the bob 25 will also change so that an appropriate reading may be obtained on the gauge (not shown) operatively connected to the mechanism within the housing 21.

As clearly illustrated in Fig. 3, the upper end of an elongated arm or valve stem 27 extends into the sleeve 20 wherein said stem is free to move either upwardly or downwardly and it will be noted that at its upper end said stem 27 is provided or carries an enlarged flange or disk 27a, the diameter of which is slightly less than the inner diameter of the sleeve 20 to provide a restricted passage therebetween which is in effect a bleeder. This thereby provides for the easy transmission of the vacuum force into the reservoir 17. At its lower end the valve stem is confined within a valve housing 28 and said housing has an integral inwardly extending preferably annular flange 29, the upper end of which is beveled to provide a valve seat as illustrated in Fig. 4. The lower end of the stem 27 has integral therewith and carries a ball or valve element 30 which is adapted to block the conduit or passage 31 in the valve housing 28 when the ball is in seated position illustrated in Fig. 4. When the ball 30 is in elevated position communicative continuity is established between the passage 31 and the valve housing and the reservoir 17. Suitable stop means (not shown) are provided for limiting the upward movement of the stem 27 and hence, the flange 27a. By virtue of the stop means, the flange 27a is spaced below the lower end of tube 18 when in its uppermost position and never covers or seats on the lower end of tube 18.

The lower end of the valve housing 28 extends through an aperture in the lower wall 11 of the housing 10 and is welded or equivalently secured to said wall 11 in a pressure tight seal. A short tube section or conduit or the like 32 extends into the lower end of the valve housing 28 and is secured therein in a pressure tight seal by welding or the like so that said tube section 32 is communicatively connected with the reservoir 17 when the valve stem is in elevated positions. An elongated tube or pipe 33 extends upwardly through the wall 11 in which said tube 33 is secured in a vacuum tight seal by welding or the like as illustrated in Fig. 1 and said tube 33 extends above the upper level of the oil mass 26 and preferably terminates in the reservoir slightly below the wall 12 of the housing 10.

At the lower end thereof the tube 32 has mounted thereon in a pressure tight seal a short length of flexible hose or tubing 34 and an adjustable manually operable clamp 35 secures said flexible hose 35 onto the end of the tube 32. A short length of flexible tubing or hose 36 is mounted in a pressure tight seal on the lower end of the elongated pipe 33 and a manually operated clamp 37 secures said flexible tubing 36 on the lower end of said pipe 33.

A suitable conduit 38 has its upper end removably mounted in a pressure tight seal in the lower end of the flexible tubing 34 and said conduit 38 normally extends downwardly sufficiently far so that its lower end is normally and completely immersed and covered by the oil mass 39 in the crank case (not shown). Adjacent the conduit 38 a shorter conduit 40 has its upper end adjustably secured in the lower end of flexible tubing 36 and a suitable bracket 41 holds the conduits 38 and 40 adjacent each other as illustrated in Fig. 1. The lower end of conduit 40 is sufficiently short so that at times, when the oil in the crank case is at its normally low level, the end thereof will be above the level of the mass 39 but said conduit is of sufficient length so that its lower end will be immersed when the oil in the crank case reaches the level indicated by the dotted lines in Fig. 1. The cause of variation in the oil level of the oil mass 39 in the crank case will hereinafter become apparent.

The operation of my device is as follows:

When the motor or engine is in non-operative positions, gravity force will cause the valve to be closed so that the ball 30 is in the seat in housing 28. When the motor or engine is started, vacuum from the combustion chamber is transmitted through the tube 19 and through the sleeve 20 into the reservoir 17, and at the same time a partial vacuum is maintained in the chamber of sleeve 20. Such vacuum in said sleeve chamber is sufficient to cause elevation of the stem 27 with the resulting unseating of the ball 30. Inasmuch as there is a small clearance between the flange 27a and the walls of the sleeve 20, a portion of the vacuum force will be exerted within the reservoir 17. As long as the engine or motor is operating so that a vacuum force is exerted against the flange 27a, the valve will remain open.

When the valve is thus opened by the partial vacuum produced in the chamber of sleeve 20, oil from the reservoir is permitted to flow by gravity through the valve 28, whose upper end is normally below the level of the oil mass 26, and the oil flowing through said valve will merge with the mass 39, as illustrated in Fig. 1. Such last mentioned gravity flow of oil is the result of the simultaneous dissipation of the vacuum in the reservoir 17 from the intake of air from the space above the oil mass in the crank case into said reservoir and through the conduit 40 through the elongated pipe 33 and into the reservoir.

During such inflow of air through the pipe 33 and conduit 40, which inflow has a tendency to equalize the pressures in the crank case and in the reservoir, the pressure in the chamber of sleeve 20 is maintained below atmospheric pressure. As the level of the oil mass 39 rises as a result of said last mentioned gravity oil flow, the level of the oil mass 39 will rise to a sufficient level to cause immersion of the lower end of the conduit 40 to thereby block any further entrance of air into said conduit 40 and into reservoir 17. When the oil level in the crank case has risen to cover the lower end of tube 40, air flow communication between the atmosphere and the reservoir is disestablished. Inasmuch as a vacuum is maintained in sleeve 20, and since the flange 27a is of smaller diameter than the interior diameter of the sleeve 20, air from within the reservoir is withdrawn to thereby cause oil to be drawn up into the reservoir through the pipes 33 and 38. It will be understood that as soon as the vacuum supply source becomes inoperative, the force holding the valve open will cease and the valve will again close to thereby stop any further flow of oil through the valve into the mass 39. I am thus able to control at all times, the level of the oil mass 39 so that the level of said mass 39 will never be above a predetermined amount.

As illustrated in Fig. 5, a modified form of my invention is shown. It will be noted that the pipe section 18 has connected thereto a short bleeder or pipe section 50 which extends into the reservoir, this representing a modification of the bleeder means which I have previously described. The form of my invention employing this type of bleeder is used in order to increase the degree of vacuum present in the reservoir 17.

It will be noted by referring to Fig. 5, in this modified form, in which the bleeder 50 is employed, the flange 27a of the valve stem 27 (when raised by partial vacuum in sleeve 20) acts to block off the end of the tube 18 so that no further air will pass through the space between sleeve 20 and flange 27a. This closing will result in the withdrawal of air from the reservoir through the restricted passage of bleeder 50. The partial vacuum thus created in reservoir 17 will cause oil to be drawn through conduit 40 upwardly from the crank case into reservoir 17.

It will thus be understood that in the bleeder means shown in Fig. 3, wherein a restricted passage is always present between flange 27a and sleeve 20 and the bleeder means shown in Fig. 5, the interior of the reservoir is always maintained in communication with a vacuum source when the engine is operating. However, because of these bleeder means, the effect of the partial vacuum present in sleeve 20 has very little effect on the pressure in the reservoir when the lower opening of conduit 40 is in communication with the atmosphere.

However, when the oil in the crank case closes the lower opening in conduit 40, then a substantial part of the air in reservoir 17 can be evacuated to effect the aforesaid result.

It will thus be seen that in both the bleeder means shown the reservoir is always maintained in air communication with the vacuum source during engine operation, regardless of the position of flange 27a in sleeve 20.

As many changes could be made in the above construction, and many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In combination with a crank case, means providing a reservoir; an automatically operable valve in said reservoir for selectively permitting the flow of oil therethrough toward said crank case; a conduit communicatively connected with the reservoir and adapted to selectively permit a flow therethrough to said crank case when said valve is in open position; means communicatively connected to said crank case for developing a partial vacuum in said reservoir and actuating said valve to open position; and a vent extending from said crank case into said reservoir and adapted to permit a flow of air therethrough to thereby permit a flow through said valve and into said crank case.

2. In combination with a crank case, means providing a reservoir; an automatically operable valve in said reservoir for selectively permitting the flow of oil therethrough toward said crank case; a conduit communicatively connected with the reservoir and adapted to selectively permit a flow therethrough to said crank case when said valve is in open position, said conduit normally being continuously immersed in oil in said crank case; means communicatively connected to said crank case for developing a partial vacuum in said reservoir and actuating said valve to open position; and a vent extending into said reservoir above the liquid level and having an opening therein above the lower end of said conduit whereby said vent will selectively draw oil or air from said crank case into said reservoir when said opening is covered or uncovered, the withdrawal of air through said vent resulting in the flow from said reservoir through said conduit into said crank case.

3. In combination with a crank case, means providing a reservoir; an automatically operable valve in said reservoir for selectively permitting the flow of oil therethrough toward said crank case, said valve having an elongated valve stem; a vacuum inlet conduit having a lower opening adapted to be partially occluded by the upper end of said stem; a discharge conduit communicatively connected with the reservoir and adapted to selectively permit a flow therethrough to said crank case when said valve is in open position, said discharge conduit normally being continuously immersed in oil in said crank case; said vacuum conduit being normally communicatively connected to an intake manifold; and a vent extending into said reservoir above the liquid level and having an opening therein above the lower end of said conduit whereby said vent will selectively draw oil or air from said crank case into said reservoir when said opening is covered or uncovered, the withdrawal of air through said vent resulting in the flow from said reservoir through said inlet conduit into said crank case.

4. In a device for maintaining the oil level in a crank case, in combination, means providing a reservoir and communicatively connecting said reservoir with the intake manifold of an internal combustion engine; a valve controlled discharge tube extending from the reservoir and having an opening in the oil mass in the engine crank case; a vacuum inlet tube communicatively connected to the engine intake manifold and opening into said reservoir, the stoppage of maintenance of partial vacuum in the engine intake manifold being adapted to permit entry of air under normal pressure into said vacuum tube, the engine operation being adapted to create a partial vacuum in said vacuum tube; a bleeder connected to said vacuum inlet tube and extending to said reservoir; a valve element operatively connected to the valve discharge tube and having closure element at one end and a head at its opposite upper end slidable in said inlet tube; said valve head being positioned to be raised to effect opening of said valve upon occurrence of a vacuum in said vacuum inlet tube; venting means extending into the crank case and having an opening above the level of said discharge tube opening, said venting means being adapted to discharge air into said reservoir to thereby permit the flow of oil through said discharge tube until the opening in said venting means is covered whereupon oil will be drawn into the reservoir.

5. In a device for maintaining the oil level in a crank case, in combination, means providing normally sealed reservoir, a discharge tube extending from the lower part of said reservoir and having an opening in the oil chamber in the crank case and normally immersed in the oil mass; a vacuum inlet tube extending in said reservoir and adapted to be connected to the intake manifold; a bleeder communicatively connected to said inlet tube and opening into said reservoir;

the engine operation being adapted to produce a partial vaccum in said reservoir by withdrawing air through said bleeder; a vent pipe extending from the upper part of said reservoir and opening in said reservoir, and extending to a point at the normal surface of the oil mass in the crank case the lower end of said vent pipe being above the lower end of the discharge pipe, the production of substantial vacuum in the upper portion of said reservoir, when the lower ends of said discharge tube and said vent pipe are below the oil level, being adapted to raise part of the oil through said discharge tube and said vent pipe to discharge such oil into said reservoir until the level of oil in the crank case is lowered sufficiently to admit air into the lower end of said vent pipe, whereupon the vacuum in said reservoir is reduced sufficiently to permit oil to flow back through said discharge tube to said crank case.

6. In a device for maintaining the oil level in a crank case, in combination, means providing a reservoir, a valve controlled discharge tube extending from the reservoir and having an opening in the oil mass in the crank case; a vacuum inlet tube opening in and communicatively connecting to the said reservoir; a bleeder connected to said inlet tube and extending into said reservoir; a valve stem operatively connected to the valve in said discharge tube and having a closure element at one end and a head, said head being positioned to be raised to open said valve upon occurrence of a vacuum in said vacuum inlet tube, and venting means extending from the upper portion of said reservoir and extending into the crank case and having an opening above the level of said discharge tube opening, said venting means being adapted to discharge air into said reservoir when the oil mass is lowered to unseal its lower opening, to thereby permit the downward flow of oil from said reservoir through said discharge tube until the lower opening in said venting means is covered.

7. In a device substantially as recited in claim 4 wherein said first mentioned means providing a reservoir comprises a housing member; and a gauge housing having a portion thereof extending into said reservoir; and a float member actuated in said reservoir and connected to said gauge housing whereby a level of oil in the reservoir may be indicated.

8. In a device for maintaining the oil level in a crank case, in combination, means providing a reservoir; a valve controlled discharge tube and having a movable valve therein and extending from the reservoir and having an opening in the area of the oil mass in the crank case; a vacuum inlet tube opening to the valve in said discharge tube and having a closure element at one end and a head, said head being positioned in said vacuum inlet tube and adapted to be raised to open said valve upon the occurrence of a vacuum in said vacuum inlet tube; and venting means extending into the upper portion of said reservoir and into the upper portion of said reservoir and into the area of the oil mass in said crank case, and adapted to intermittently deliver air and oil from the crank case to the reservoir as the level of the oil in the crank case varies.

References Cited in the file of this patent

UNITED STATES PATENTS

| Number | Name | Date |
|---|---|---|
| 1,125,238 | Wilburn | Jan. 19, 1915 |
| 1,428,017 | Edwards | Sept. 5, 1922 |
| 1,936,778 | White | Nov. 28, 1933 |